United States Patent [19]
Lasater et al.

[11] Patent Number: 5,200,218
[45] Date of Patent: Apr. 6, 1993

[54] COMPOSITION FOR DOG FOOD

[76] Inventors: Priscilla D. Lasater; Donald C. Mooers, both of P.O. Box 1305, Pahrump, Nev. 89041

[21] Appl. No.: 622,734

[22] Filed: Dec. 5, 1990

Related U.S. Application Data

[63] Continuation-in-part of Ser. No. 433,163, Nov. 8, 1989, abandoned.

[51] Int. Cl.$^5$ ................................................ A23K 1/00
[52] U.S. Cl. ........................................ 426/72; 426/74; 426/549; 426/623; 426/630; 426/641; 426/646; 426/658; 426/805
[58] Field of Search .................. 426/72, 74, 623, 630, 426/805, 641, 646, 549

[56] References Cited

U.S. PATENT DOCUMENTS

| | | | |
|---|---|---|---|
| 3,202,514 | 8/1965 | Burgess | 99/2 |
| 4,055,666 | 10/1977 | Jeffreys | 426/31 |
| 4,454,164 | 6/1984 | Gellman et al. | 426/549 |
| 4,508,741 | 4/1985 | Corbett et al. | 426/303 |
| 4,735,808 | 4/1988 | Scaglione et al. | 426/62 |
| 4,892,748 | 1/1990 | Anderson et al. | 426/635 |
| 4,904,495 | 2/1990 | Spanier | 426/646 |

OTHER PUBLICATIONS

The Real Food Cookbook, Ethel H. Renwick, 1978.
Hawley "The Condensed Chemical Dictionary" Van Nostrand Reinhold Company New York 10th Edition (1982) pp. 91, 221 and 1035.
Nutrient Requirements of Domestic Animals No. 8 "Nutrient Requirements of Dogs" National Academy of Sciences Washington D.C. (1974) pp. 35–51.

*Primary Examiner*—R. B. Penland
*Attorney, Agent, or Firm*—John Edward Roethel

[57] ABSTRACT

The dog food formula is a composition comprising the following ingredients: brewer's yeast, bran, biscuit mix, water, desiccated liver, safflower or corn oil, ascorbic acid and chelated zinc. Additional ingredients may also be included such as bone meal, lecithin oil, wheat germ oil, soy oil, wheat flour, honey and flavorings such as meat or fish.

13 Claims, No Drawings

COMPOSITION FOR DOG FOOD

CROSS-REFERENCE TO RELATED APPLICATIONS

This application is a continuation-in-part application of copending U.S. application Ser. No. 07/433,163, filed Nov. 8, 1989, now abandoned.

BACKGROUND OF THE INVENTION

This invention relates to a composition for dog food, and more particularly to a composition for dog food that is in the form of a dog cookie that can be used as a dietary supplement and can be given to the dog as a treat. The dog food composition is based primarily on brewer's yeast, bran, biscuit mix, water, desiccated liver, safflower or corn oil, ascorbic acid and chelated zinc. Additional ingredients may also be included such as bone meal, lecithin oil, wheat germ oil, soy oil, wheat flour, honey and flavorings such as meat or fish.

The nutrition and health of dogs is one of the most important aspects of pet care. Many dog owners have a difficult time determining if their dog is receiving a well-balanced and healthy diet. While people are becoming much more aware regarding their own personal nutrition, there is little knowledge of the basic dietary requirements that a dog must have.

The general knowledge is that dogs are carnivorous animals, but this does not necessarily mean that a dog can healthfully exist on a diet of red meat. Dogs should be fed a diet combining water, proteins, carbohydrates, fats, vitamins, minerals and amino-acids. A dog needs the correct balance of this items, since feeding a dog an excess of one item may neutralize the effect of other items.

The protein requirements for a dog can come from red meats such as beef and white meats such as chicken. Other excellent sources of protein for dogs is fish and vegetable proteins.

Carbohydrates should be included for a balanced diet. Typical sources of carbohydrates for dogs are biscuits, biscuit meal or baked brown bread. The biscuits or bread can be soaked to provide moisture for the dog and these items are good for the dog's teeth in that they prevent the accumulation of tartar and help keep the teeth clean.

Fats are necessary for dogs because fats contain vitamins A and D which are essential for a good skin and coat. Too much fat however can cause nausea and vomiting.

Vitamins are also quite important to a dog's health and is often missing from a dog's diet if the dog is only fed packaged dog food. Vitamin B and vitamin E are important and good sources of these vitamins are beef liver and vegetable oils. The use of corn oil or linseed oil is beneficial for a dog's coat. Vitamin A is also important in that it helps prevent ear cankers.

Roughage is also important for dogs in that it assists in keeping the dog's stool firm and prevents diarrhea.

In order to ensure that the dog receives the nutrients that are required for good health, it is proposed to provide a dietary supplement in the form of a dog cookie that the pet owner can give to his dog as a treat, but nevertheless ensuring that the dog receives the nutrients necessary.

The dog food composition of the present invention combines quality of ingredients and consistency of product in a cookie that is both appealing to the dog and tastes good. The preferred design of the product in the form of a cookie encourages the dog to eat things such as bran and brewer's yeast that it would not normally relish. The product design in the form of a moist cookie allows dogs of all ages from the youngest with undeveloped teeth to the oldest whose teeth may be infirm to be able to easily consume the cookie.

The nutrients come from natural sources, are not artificially inserted into the product and contain no preservatives. No animal fat or grease is used in the composition. Crude fats, crude carbohydrates and crude protein are not used in the preferred embodiments of the present invention.

It is an object of the present invention to provide a dog food formula that can be used to supplement a dog's daily diet to ensure that a dog receives a wide range of generously proportioned and nutritious ingredients.

It is a feature of the present invention to provide a dog food formula comprising the following ingredients: brewer's yeast, bran, biscuit mix, water, desiccated liver, safflower or corn oil, ascorbic acid and chelated zinc. Additional ingredients may also be included such as bone meal, lecithin oil, wheat germ oil, soy oil, wheat flour, honey and flavorings such as meat or fish.

It is an advantage of the present invention that a dog will receive the necessary vitamins and minerals to improve his coat and skin, to protect the dog from fleas, to improve the dog's digestion, to build and keep strong bones and to generally improve and maintain the dog's overall health.

SUMMARY OF THE INVENTION

The dog food formula is a composition comprising the following ingredients: brewer's yeast, bran, biscuit mix, water, desiccated liver, safflower or corn oil, ascorbic acid and chelated zinc. Additional ingredients may also be included such as bone meal, lecithin oil, wheat germ oil, soy oil, wheat flour, honey and flavorings such as meat or fish.

DETAILED DESCRIPTION OF THE PREFERRED EMBODIMENTS

The dog food formula is designed as a dietary supplement to a normal regimen of dry dog food recommended by most veterinarians. Depending on the climate, location, feeding habits, lifestyle and many other variables, dogs like humans often do not receive the vitamins, minerals and other nutrients that are necessary for the dog to live an happy and healthful life.

The basic dog food composition of the present invention is a combination of the following ingredients: brewer's yeast, bran, biscuit mix, water, desiccated liver, safflower or corn oil, ascorbic acid and chelated zinc.

The brewer's yeast is included to improve the dog's coat and to prevent fleas. Brewer's yeast provides the dog with the following nutrients—vitamin B1, vitamin B2, vitamin B12, folic acid, niacin, palothenic acid, biotin, inositol, choline, paraaminobenzoic acid, ribonucleic acid, deoxyribonucleic acid, potassium, phosphorus, sulphur, magnesium, sodium, calcium, zinc, iron, chromium and selenium.

The bran adds roughage to the dog's diet and is included to improve the dog's digestion and to assist in the proper functioning of the dog's colon.

The biscuit mix makes the resulting mixture into the consistency of a soft cookie.

The water is used to aid in the mixing of the ingredients and to give the finished product as moist consistency so that it will be more appealing to dogs.

The desiccated liver is included to prevent iron-deficiency and to promote resistance to disease. It also aids growth, is good for lactating mothers and assist in giving the dog good skin tone. The desiccated liver provides protein, vitamin B1, vitamin B2, niacin, iron, vitamin B6, folic acid, vitamin B12 and biotin. In a preferred embodiment, defatted desiccated liver is used.

The safflower oil is added to improve the dog's coat. Corn oil can also be used in place of the safflower oil.

The ascorbic acid (vitamin C) is included to prevent arthritis and dysplasia.

The chelated zinc is included to aid in growth of the dog and to assist in the repair of injured tissues.

In the preferred embodiment of the present invention, the ingredients are mixed together in proportions according to the following general ranges:

| Ingredient | Parts |
| --- | --- |
| brewer's yeast | 2-4 |
| bran | 3-5 |
| biscuit mix | 2-6 |
| water | 3-4.2 |
| desiccated liver | 0.5-1.5 |
| safflower or corn oil | 1-2 |
| ascorbic acid | 0.75-1.5 grams/pound |
| chelated zinc | 2-4 grams/pound. |

Additional ingredients that may be added to the dog food composition include bone meal, lecithin oil, wheat germ oil, soy oil, wheat flour, honey and flavorings such as fish or meat such as bacon, chicken or beef.

The bone meal provides calcium and phosphorus.

The lecithin oil improves the circulation of the dog's blood and provides iron, vitamin E, phosphorus and magnesium.

The wheat germ oil provides vitamin E, vitamin A, vitamin C, thiamine, riboflavin, niacin, calcium and iron.

The soy oil improves the dog's coat and adds additional protein to the diet.

The wheat flour adds roughage to the dog's diet, can be metabolized by the dog and is used to extend the mixture.

The honey contains vitamin A and makes the resulting cookie soft. The meat flavorings or fish flavoring are added to improve the palatability and to make the food more attractive to the dog.

In the preferred embodiment of the present invention, the additional ingredients are added in proportion according to the following general ranges:

| Additional Ingredients | Parts |
| --- | --- |
| bone meal | 1-2 |
| lecithin oil | 0.1-0.25 |
| wheat germ oil | 0.1-0.25 |
| soy oil | 0.1-0.25 |
| wheat flour | 2-6 |
| honey | 0.33-1.25 |
| flavorings | 1-4 cc/pound. |

The following examples contain the preferred mixtures for the dog food composition of the present invention.

EXAMPLE 1

| Ingredient | Parts |
| --- | --- |
| brewer's yeast | 2.5 |
| bran | 4 |
| biscuit mix | 2 |
| water | 3.25 |
| desiccated liver | 0.75 |
| safflower or corn oil | 0.375 |
| ascorbic acid | 1 gram/pound |
| chelated zinc | 2.4 grams/pound. |

The ingredients are mixed together until the composition reaches the desired consistency. The mixture is shaped into circular cookies and baked until done. If a convection oven is used, it is recommended that the cookies be baked at 400° F. for 13-15 minutes. Alternatively, the cookies may be baked at 500° F. for 10-12 minutes. If a radiant oven is used, it is recommended that the cookies be baked at 350° F. for 30-55 minutes. Alternatively, the cookies may be baked at 500° F. for 15-18 minutes.

Other preferred embodiments use the additional ingredients:

EXAMPLE 2

| Ingredient | Parts |
| --- | --- |
| brewer's yeast | 2.5 |
| bran | 4 |
| wheat flour | 2 |
| biscuit mix | 2 |
| honey | 0.67 |
| water | 3.25 |
| bone meal | 1.25 |
| desiccated liver | 0.75 |
| lecithin oil | 0.375 |
| wheat germ oil | 0.125 |
| safflower or corn oil | 0.375 |
| ascorbic acid | 1 gram/pound |
| chelated zinc | 2.4 grams/pound |
| flavoring | 1 cc/pound. |

The mixture in this example can be prepared in the same manner as that used for Example 1.

EXAMPLE 3

| Ingredient | Parts |
| --- | --- |
| brewer's yeast | 1.45 |
| bran | 2 |
| wheat flour | 3 |
| biscuit mix | 3 |
| honey | 0.5 |
| water | 1.5 |
| bone meal | 1.45 |
| desiccated liver | 0.67 |
| lecithin oil | 0.5 |
| wheat germ oil | 1.5 |
| safflower or corn oil | 0.5 |
| ascorbic acid | 0.75 grams/pound |
| chelated zinc | 2 grams/pound |
| flavoring | 2 cc/pound. |

The mixture in this example can be prepared in the same manner as that used for Example 1.

EXAMPLE 4

| Ingredient | Parts |
| --- | --- |
| brewer's yeast | 2.5 |
| bran | 4 |
| biscuit mix | 5 |
| honey | 1.25 |
| water | 3.25 |
| bone meal | 1.25 |
| desiccated liver | 0.75 |
| lecithin oil | 0.125 |
| wheat germ oil | 0.125 |
| safflower or corn oil | 1 |
| ascorbic acid | 1 gram/pound |
| chelated zinc | 2.4 grams/pound. |

The mixture in this example can be prepared in the same manner as that used for Example 1.

While the invention has been illustrated with respect to several specific embodiments thereof, these embodiments should be considered as illustrative rather than limiting. Various modifications and additional may be made and will be apparent to those skilled in the art. Accordingly, the invention should not be limited by the foregoing description, but rather should be defined only by the following claims.

What is claimed is:

1. A dog food supplement composition consisting essentially of: ingredients combined in proportion according to the following ranges:

| Ingredient | Parts |
| --- | --- |
| brewer's yeast | 2-4 |
| bran | 3-5 |
| biscuit mix | 2-6 |
| water | 3-4.2 |
| desiccated liver | 0.5-1.5 |
| safflower oil | 1-2 |
| ascorbic acid | 0.75-1.5 grams/pound |
| chelated zinc | 2-4 grams/pound, | said supplement composition improves and maintains the dog's overall health and is in the form of a moist cookie.

2. The dog food composition of claim 1 further consisting essentially of additional ingredients selected from the group consisting of bone meal, lecithin oil, wheat germ oil, soy oil, wheat flour, honey and flavorings of meat or fish.

3. The dog food composition of claim 2 wherein the meat flavoring is selected from the group consisting of bacon, beef and chicken.

4. The dog food composition of claim 2 wherein the additional ingredients are in proportions according to the following ranges:

| Additional Ingredients | Parts |
| --- | --- |
| bone meal | 1-2 |
| lecithin oil | 0.1-0.25 |
| wheat germ oil | 0.1-0.25 |
| soy oil | 0.1-0.25 |
| wheat flour | 2-6 |
| honey | 0.33-1.25 |
| flavorings | 1-4 cc/pound. |

5. A dog food supplemental composition consisting essentially of:

| Ingredient | Parts |
| --- | --- |
| brewer's yeast | 2.5 |
| bran | 4 |
| biscuit mix | 2 |
| water | 3.25 |
| desiccated liver | 0.75 |
| safflower oil | 0.375 |
| ascorbic acid | 1 gram/pound |
| chelated zinc | 2.4 grams/pound, | said supplement composition improves and maintains the dog's overall health and is in the form of a moist cookie.

6. The dog food composition of claim 5 further consisting essentially of additional ingredients selected from the group consisting of bone meal, lecithin oil, wheat germ oil, soy oil, wheat flour, honey and flavorings of meat or fish.

7. The dog food composition of claim 6 wherein the meat flavoring is selected from the group consisting of bacon, beef and chicken.

8. The dog food composition of claim 6 wherein the additional ingredients are in proportions according to the following ranges:

| Additional Ingredients | Parts |
| --- | --- |
| bone meal | 1-2 |
| lecithin oil | 0.1-0.25 |
| wheat germ oil | 0.1-0.25 |
| soy oil | 0.1-0.25 |
| wheat flour | 2-6 |
| honey | 0.33-1.25 |
| flavorings | 1-4 cc/pound. |

9. A dog food supplemental composition consisting essentially of:

| Ingredient | Parts |
| --- | --- |
| brewer's yeast | 1.45 |
| bran | 2 |
| wheat flour | 3 |
| biscuit mix | 3 |
| honey | 0.5 |
| water | 1.5 |
| bone meal | 1.45 |
| desiccated liver | 0.67 |
| lecithin oil | 0.5 |
| wheat germ oil | 1.5 |
| safflower oil | 0.5 |
| ascorbic acid | 0.75 grams/pound |
| chelated zinc | 2 grams/pound |
| flavoring | 2 cc/pound, | said supplement composition improves and maintains the dog's overall health and is in the form of a moist cookie.

10. The dog food composition of claim 9 wherein the flavoring is selected from the group consisting of fish, bacon, beef and chicken.

11. A dog food supplemental composition consisting essentially of:

| Ingredient | Parts |
| --- | --- |
| brewer's yeast | 2.5 |
| bran | 4 |
| biscuit mix | 5 |
| honey | 1.25 |
| water | 3.25 |
| bone meal | 1.25 |

| Ingredient | Parts |
| --- | --- |
| desiccated liver | 0.75 |
| lecithin oil | 0.125 |
| wheat germ oil | 0.125 |
| safflower oil | 1 |
| ascorbic acid | 1 gram/pound |

| Ingredient | Parts |
| --- | --- |
| chelated zinc | 2.4 grams/pound, |

12. The dog food composition of claim 11 further including flavoring in the range of 1–4 cc/pound.

13. The dog food composition of claim 12 wherein the flavoring is selected from the group consisting of fish, bacon, beef and chicken.

* * * * *